(12) United States Patent
Kappel

(10) Patent No.: US 6,445,532 B1
(45) Date of Patent: Sep. 3, 2002

(54) IMPORT/EXPORT ELEMENT WITH LEAD SCREW AND RAMP FOR ROTATION

(75) Inventor: Glendon D. Kappel, Eagan, MN (US)

(73) Assignee: Plasmon IDE, Inc., Minneapolis, MN (US)

(*) Notice: Subject to any disclaimer, the term of this patent is extended or adjusted under 35 U.S.C. 154(b) by 107 days.

(21) Appl. No.: 09/589,547

(22) Filed: Jun. 7, 2000

(51) Int. Cl.[7] .................................................. G11B 17/22

(52) U.S. Cl. ...................... 360/92; 369/30.43; 369/30.45

(58) Field of Search ........................ 360/92; 369/30.43, 369/30.45, 30.49

(56) References Cited

U.S. PATENT DOCUMENTS

| | | |
|---|---|---|
| 4,271,440 A | 6/1981 | Jenkins |
| 4,504,936 A | 3/1985 | Faber |
| 4,607,354 A | 8/1986 | Ishibashi |
| 4,608,679 A | 8/1986 | Rudy |
| 4,614,474 A | 9/1986 | Sudo |
| 4,654,727 A | 3/1987 | Blum |
| 4,675,856 A | 6/1987 | Rudy |
| 4,742,504 A | 5/1988 | Takasuka |
| 4,779,151 A | 10/1988 | Lind |
| 4,787,074 A | 11/1988 | Deck |
| 4,815,055 A | 3/1989 | Fago, Jr. |
| 4,815,056 A | 3/1989 | Toi |
| 4,817,070 A | 3/1989 | Hug |
| 4,817,071 A | 3/1989 | Carlson |
| 4,839,758 A | 6/1989 | Honjoh |
| 4,846,619 A | 7/1989 | Crabtree |
| 4,853,916 A | 8/1989 | Tomita |
| 4,878,137 A | 10/1989 | Yamashita |
| 4,912,581 A | 3/1990 | Watanabe |

(List continued on next page.)

FOREIGN PATENT DOCUMENTS

| | | |
|---|---|---|
| EP | 0 280 263 | 8/1988 |
| EP | 0389160 | 9/1990 |
| EP | 0935246 | 8/1999 |
| JP | 59-30263 | 2/1984 |
| JP | 59-36003 | 2/1984 |
| JP | 59-231763 | 12/1984 |
| JP | 61-240474 | 10/1986 |
| JP | 1-50275 | 2/1989 |
| JP | 09022561 | 1/1997 |

*Primary Examiner*—Brian E. Miller
(74) *Attorney, Agent, or Firm*—Gerald E. Helget; Nelson R. Capes; Briggs and Morgan

(57) ABSTRACT

In a data media storage library for storing and accessing storage media, the storage media being contained in cartridges, the data media storage library having a library housing, an access opening in the library housing for inserting cartridges, a storage array within the library housing including a number of storage locations, a plurality of media storage elements adapted to hold the storage media, a plurality of data transfer elements adapted to read and write information on the storage media, and a media transport element within the library housing adapted to move the storage media between the media storage element and the data transfer element, an import/export element including: a cartridge holder receiving the media cartridge from the access opening; a first lead screw mounted in a first direction between a first point and a second point and rotating about a first axis parallel to the first direction; a cartridge holder carrier threaded on the first lead screw and connected to the cartridge holder for translation of the cartridge holder along the first axis; a second lead screw mounted in a second direction substantially transverse to the first direction, the second lead screw engaging the cartridge holder carrier for rotation about a second axis parallel to the second direction; a rotation collar threaded on the second lead screw and fixed to the cartridge holder carrier; and an inclined planar member fixed along the first direction and sliding along the rotation collar.

18 Claims, 5 Drawing Sheets

U.S. PATENT DOCUMENTS

| | | |
|---|---|---|
| 4,928,245 A | 5/1990 | Moy et al. |
| 4,972,277 A | 11/1990 | Sills et al. |
| 4,998,232 A | 3/1991 | Methlie |
| 5,001,582 A | 3/1991 | Numasaki |
| 5,010,536 A | 4/1991 | Wanger |
| 5,014,255 A | 5/1991 | Wanger |
| 5,033,038 A | 7/1991 | Kobayashi |
| 5,036,503 A | 7/1991 | Tomita |
| 5,040,159 A | 8/1991 | Oliver |
| 5,043,962 A | 8/1991 | Wanger |
| 5,056,073 A | 10/1991 | Fitzgerald |
| 5,060,211 A | 10/1991 | Blanding |
| 5,062,093 A | 10/1991 | Christi |
| 5,065,379 A | 11/1991 | Smith |
| 5,101,387 A | 3/1992 | Wanger |
| 5,123,000 A | 6/1992 | Fitzgerald |
| 5,128,912 A * | 7/1992 | Hug et al. ............... 360/99.02 |
| 5,150,341 A | 9/1992 | Shibayama |
| 5,153,862 A | 10/1992 | Taylor |
| 5,206,845 A | 4/1993 | Baxter |
| 5,220,548 A | 6/1993 | Nakatsukasa |
| 5,228,016 A | 7/1993 | Menke |
| 5,231,552 A | 7/1993 | Schneider |
| 5,255,251 A | 10/1993 | Fitzgerald |
| 5,345,350 A | 9/1994 | Ellis |
| 5,362,192 A | 11/1994 | Dang |
| 5,377,121 A | 12/1994 | Dimitri |
| 5,431,520 A | 7/1995 | Brugger |
| 5,471,561 A | 11/1995 | Cowgill |
| 5,487,579 A | 1/1996 | Woodruff |
| 5,502,697 A | 3/1996 | Taki |
| 5,517,473 A * | 5/1996 | Permut ................... 369/30.48 |
| 5,546,366 A | 8/1996 | Dang |
| 5,602,821 A | 2/1997 | McPherson |
| 5,659,434 A | 8/1997 | Yamakawa et al. |
| 5,680,375 A | 10/1997 | Christie, Jr. |
| 5,680,377 A | 10/1997 | Dang et al. |
| 5,764,615 A | 6/1998 | Ware |
| 5,798,997 A | 8/1998 | Ware |
| 5,813,009 A | 9/1998 | Johnson |
| 5,894,469 A | 4/1999 | Usami et al. |
| 5,907,529 A * | 5/1999 | Permut ................... 369/30.75 |
| 5,959,803 A | 9/1999 | Okamoto |
| 5,966,366 A | 10/1999 | Pollard |
| 5,975,450 A | 11/1999 | Leger et al. |
| 5,995,459 A * | 11/1999 | Kappel et al. ........... 369/30.55 |
| 5,999,356 A | 12/1999 | Dimitri et al. |
| 6,027,296 A * | 2/2000 | Meier ................... 198/468.01 |
| 6,141,178 A | 10/2000 | Nakajima et al. |
| 6,175,466 B1 | 1/2001 | Hori et al. |
| 6,266,316 B1 | 7/2001 | Luffel et al. |
| 6,330,217 B1 * | 12/2001 | Paul et al. .................... 360/92 |

* cited by examiner

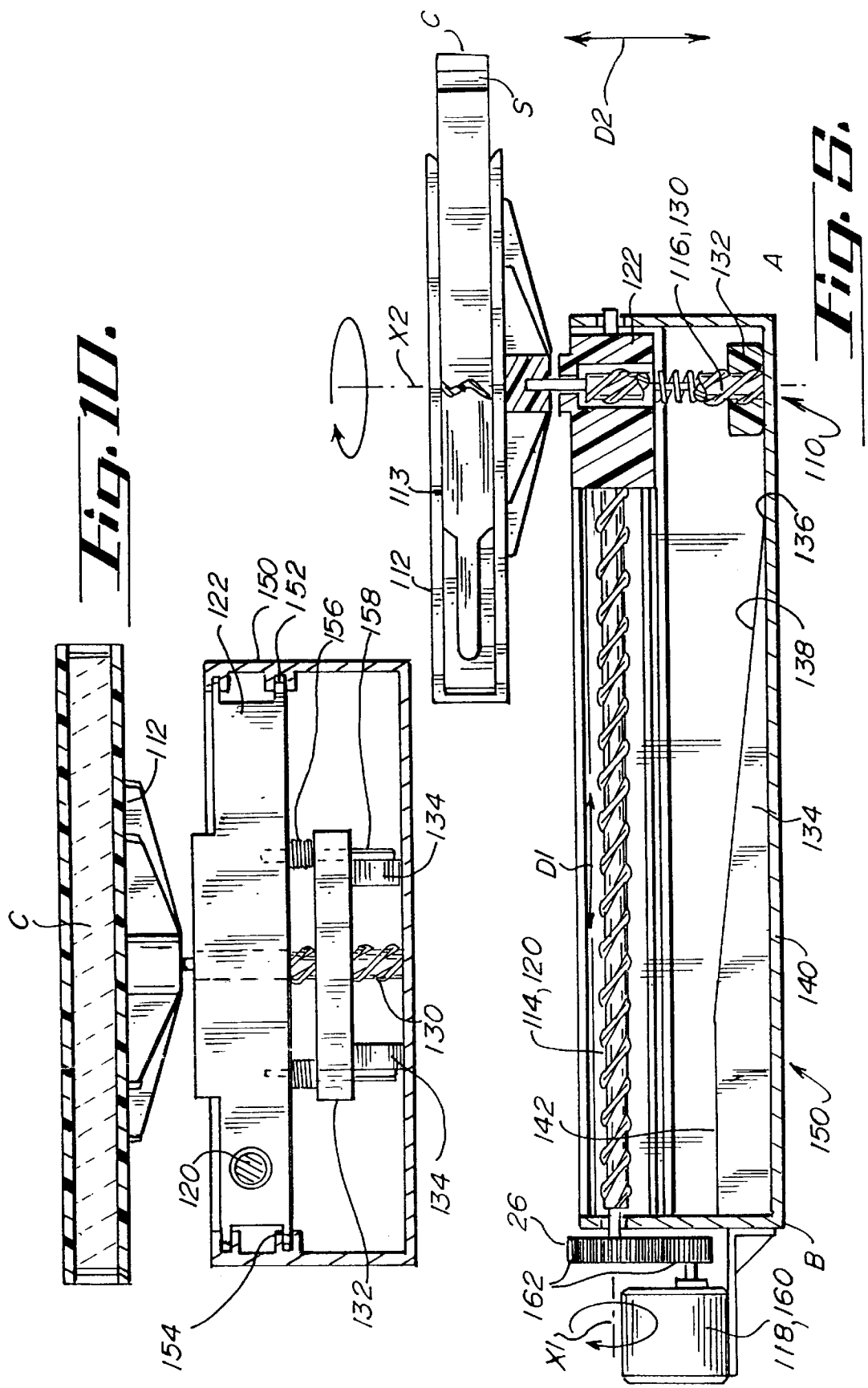

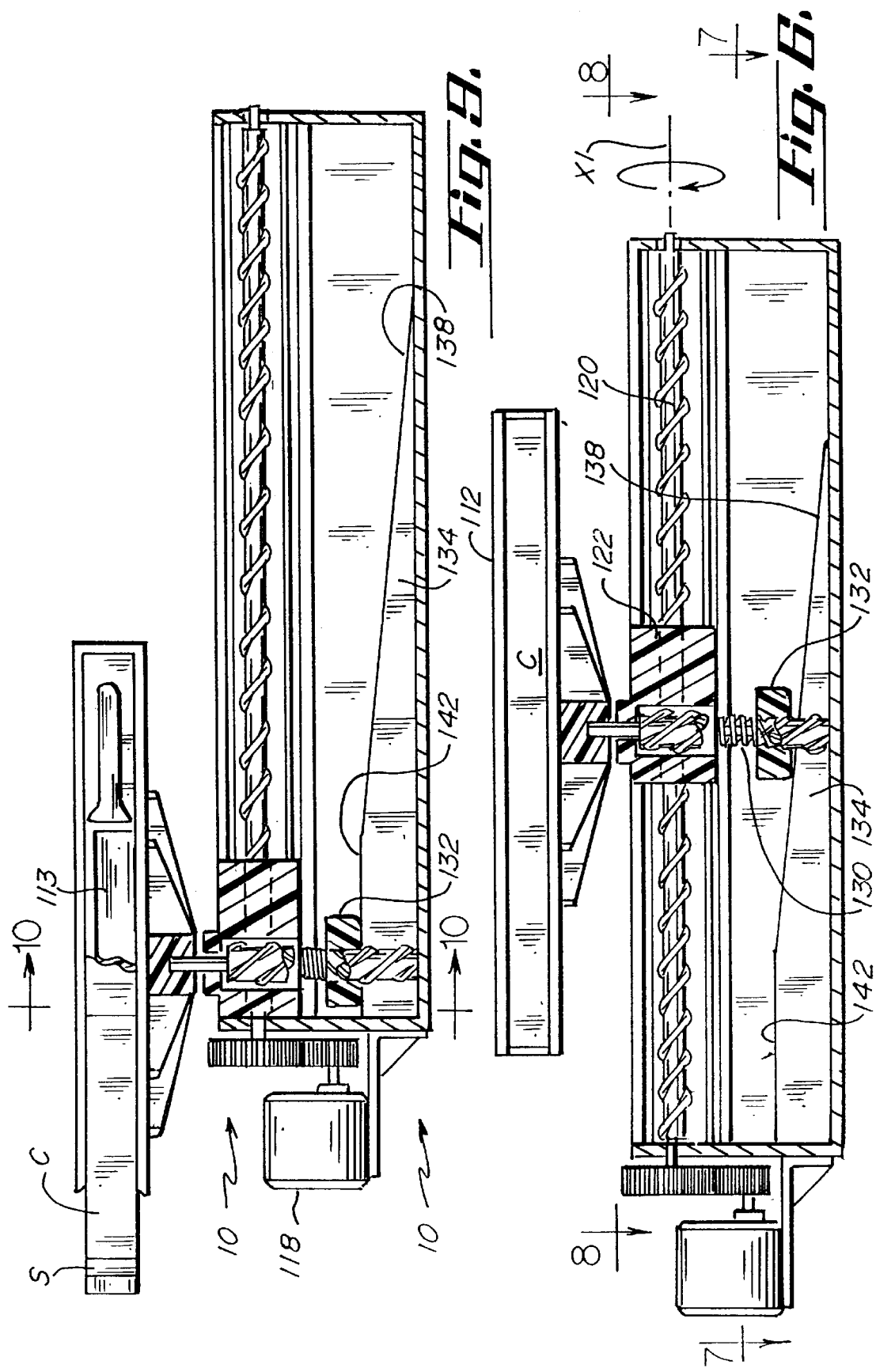

IMPORT/EXPORT ELEMENT WITH LEAD SCREW AND RAMP FOR ROTATION

BACKGROUND OF THE INVENTION

Storage media library systems (jukeboxes) are devices which contain multiple storage media drives and many pieces of storage media to accommodate installations requiring access to large numbers of storage media, such as optical discs, compact discs and tape cartridges.

A typical storage media library is generally shown in the references as reference numeral 10.

Arranged within the data storage library is at least one and preferably several media storage elements 40. The media storage elements 40 hold the storage media when the storage media are not being read or written to. The storage media can be any media that can be used to record information, such as data or graphics. The recording means may be magnetic, optical, or any other equivalent recording means known in the storage media art. Preferably, the storage media are compact discs (CDs) or tapes. In the application of the present invention, the storage media are housed in cartridges C. Each cartridge C has a pair of slots S at one end which are used by the robotics of the data storage library for moving the cartridge C from location to location within the data storage library.

Also arranged within the data storage library 10 is at least one and preferably several data transfer elements 50, which are used to read and write information on the storage media. Preferably, the data transfer elements 50 are compact disc drives (CD drives) or tape drives, but may also be any equivalent device such as an optical disc drive, a floppy disc drive, or a hard drive.

A media transfer element 70 is movable within the data storage library 10 to move the storage media among media storage elements 40 and data transfer elements 50.

Media, in cartridges C, are loaded into the data storage library by the operator by use of an import/export element 80. The cartridges C are inserted into the data storage library 10 through an access opening 12 in data storage library housing 14. The cartridges are inserted with the slots S facing the operator. Inserting a cartridge with the slots S away from the operator would be unnnatural and annoying for most operators.

However, once inside the data storage library 10, the cartridge C must be rotated 180 degrees so that the slots S are available for gripping by robotics such as the media transport element 70 which typically use "pickers" to grip the cartridge C by the slots S.

Complications may arise when trying to populate the data storage library 10 with a number of storage media.

First, the operator should not be able to gain access directly to the interior of the data storage library. The various moving mechanisms within the data storage library can cause severe injury to an operator's hand and fingers.

Furthermore, the data storage library must know at all times which particular media have been placed into it, and in which of the many media storage elements 40 the media reside. If operators are allowed access to the interior of the data storage library, it becomes impossible for the data storage library to know with assurance the location of each media.

For all of the above reasons, media must be introduced into and removed from the data storage library only through the import/export element 80, while the library is in operation.

In addition, once the media are loaded and rotated 180 degrees, they must be moved internally within the library for access by the media transport element 70.

There is a need for an improved import/export element which rotates the media 180 degrees between insertion and the robotics while at the same time translating the media within the data storage library, with a minimum of complexity and number of components.

SUMMARY OF THE INVENTION

In a data media storage library for storing and accessing storage media, the storage media being contained in cartridges, the data media storage library having a library housing, an access opening in the library housing for inserting cartridges, a storage array within the library housing including a number of storage locations, a plurality of media storage elements adapted to hold the storage media, a plurality of data transfer elements adapted to read and write information on the storage media, and a media transport element within the library housing adapted to move the storage media between the media storage element and the data transfer element, an import/export element comprising:

(a) a cartridge holder adapted to receive the media cartridge from the access opening;

(b) means for translating said cartridge holder between a first point and a second point;

(c) means for rotating said cartridge holder 180 degrees while translating said cartridge holder between said first point and said second point; and (d) means for driving said rotating means.

A principal object and advantage of the present invention is that it rotates the cartridge through 180 degrees at the same time that it translates the cartridge from one point (near the access opening) to a second point (near the media store).

Another principal object and advantage of the present invention is that it carries out the above function using a single driving motor.

Another principal object and advantage of the present invention is that involves fewer moving parts than earlier mechanisms.

BRIEF DESCRIPTION OF THE DRAWINGS

FIG. 5 is a cross-section of the import/export element of the present invention along the lines 5 of FIG. 4 showing the import/export element positioned at one end of its travel;

FIG. 6 is the same as FIG. 5, with the import/export element positioned midway along its travel;

FIG. 9 is the same as FIG. 5, showing the import/export element at the far end of its travel; and FIG. 10 is an end view of the import/export element along the lines 10 of FIG. 9.

DETAILED DESCRIPTION OF THE PREFERRED EMBODIMENTS

Figure 1:
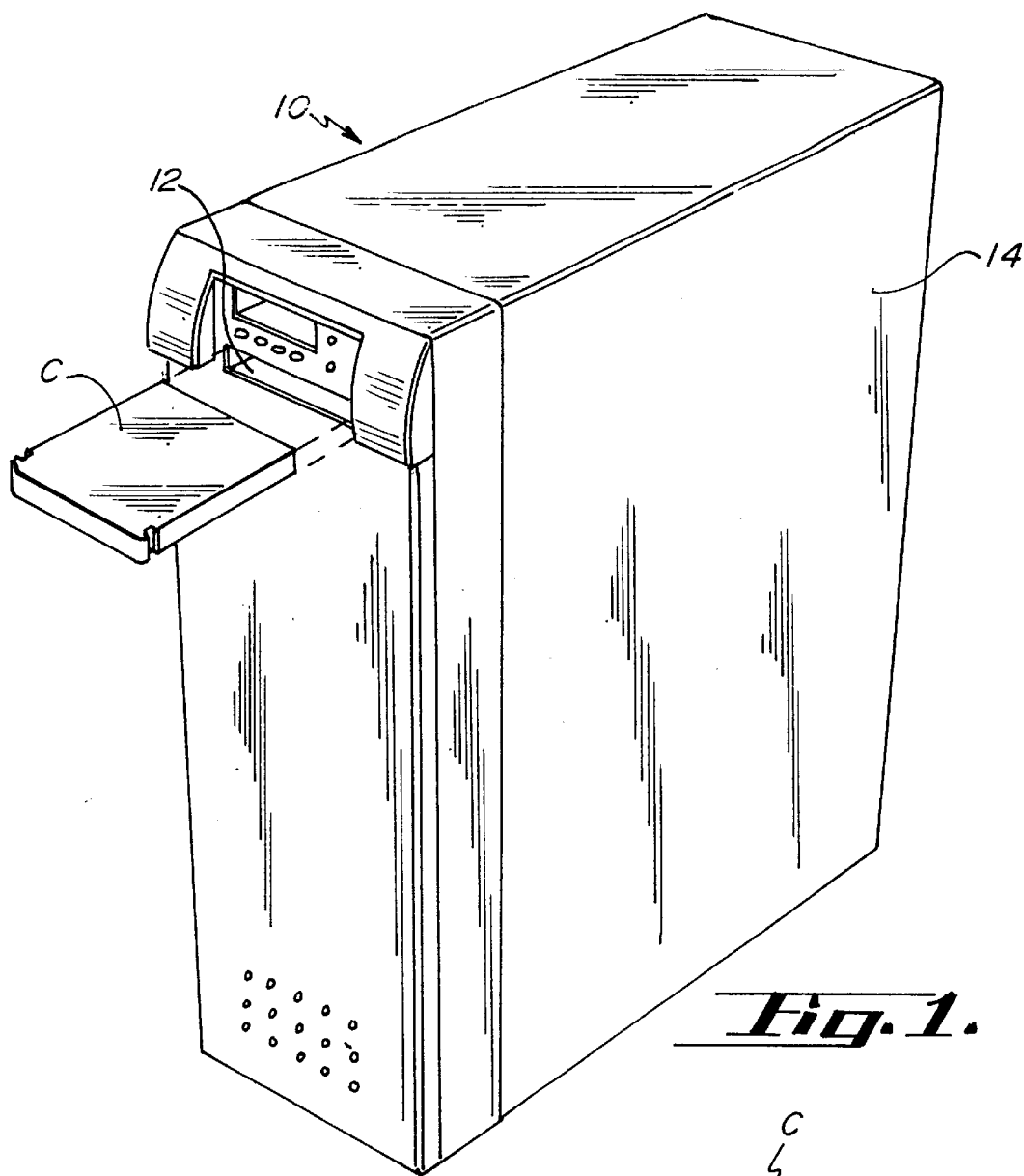
FIG. 1 is a perspective view of a data storage library in which the present invention is used, showing a cartridge C being inserted into the data storage library.
Figure 3:
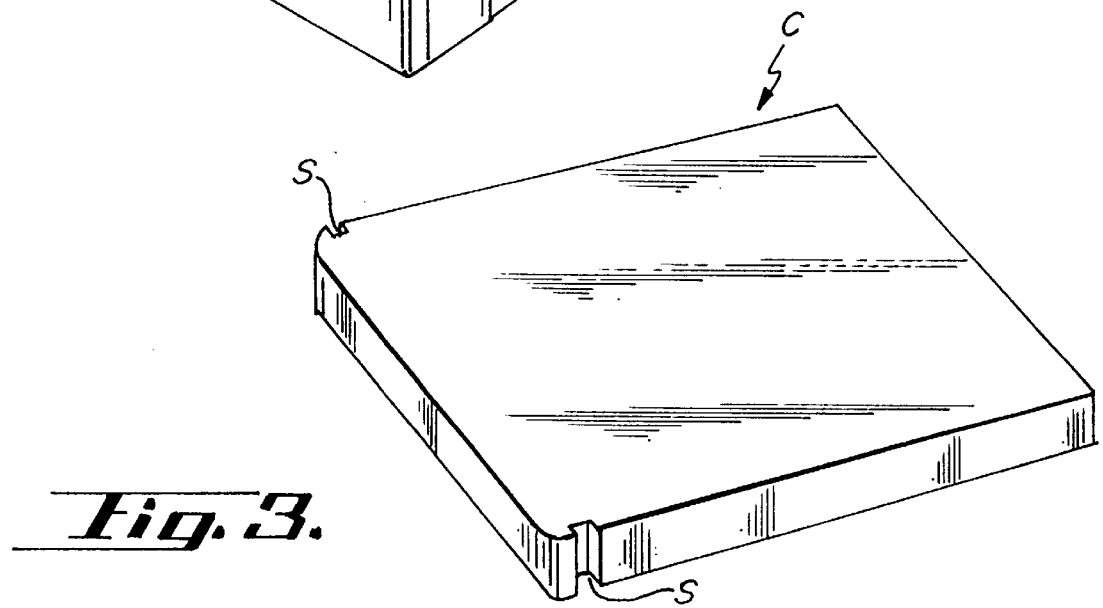
FIG. 3 is a perspective view of a media cartridge for use with the import/export element of the present invention.
Figure 2:
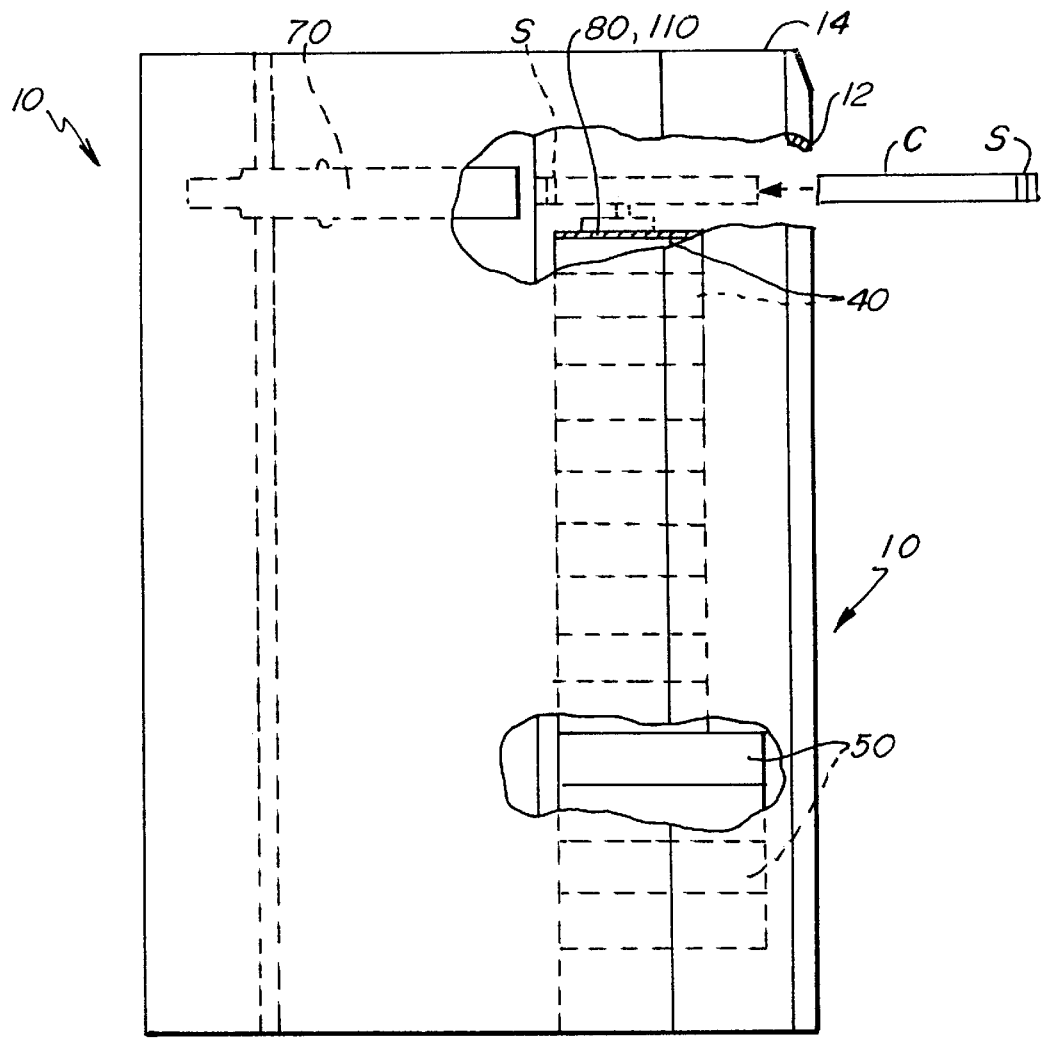
FIG. 2 is a schematic cross-section of the data storage library of FIG. 1, showing internal components in phantom, with some structure cut away to show the import/export element of the present invention.
Figure 4:
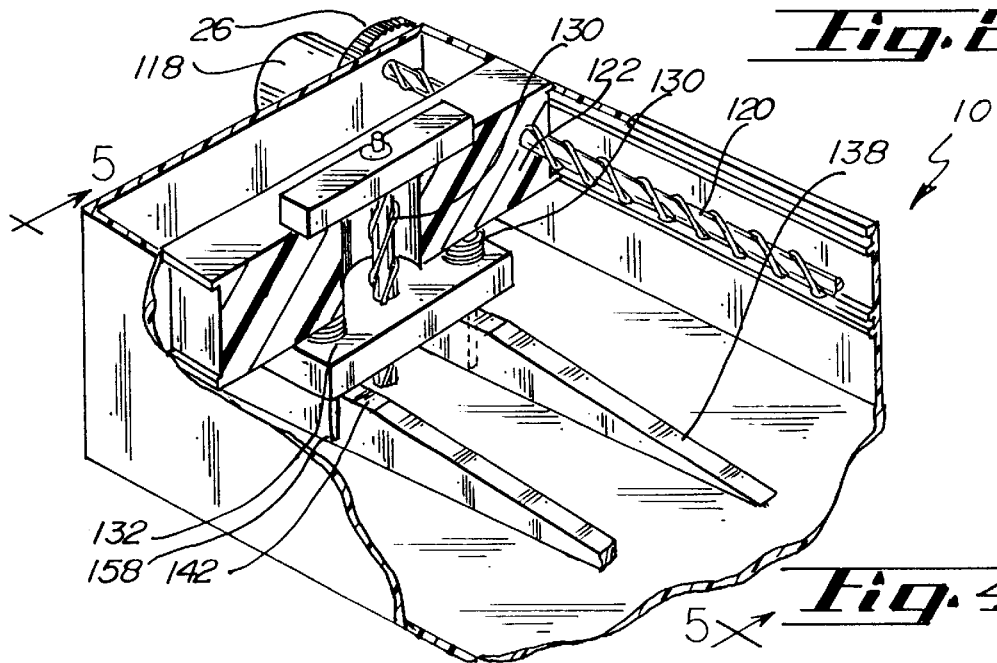
FIG. 4 is a perspective view of the import/export element of the present invention.
Figure 8:
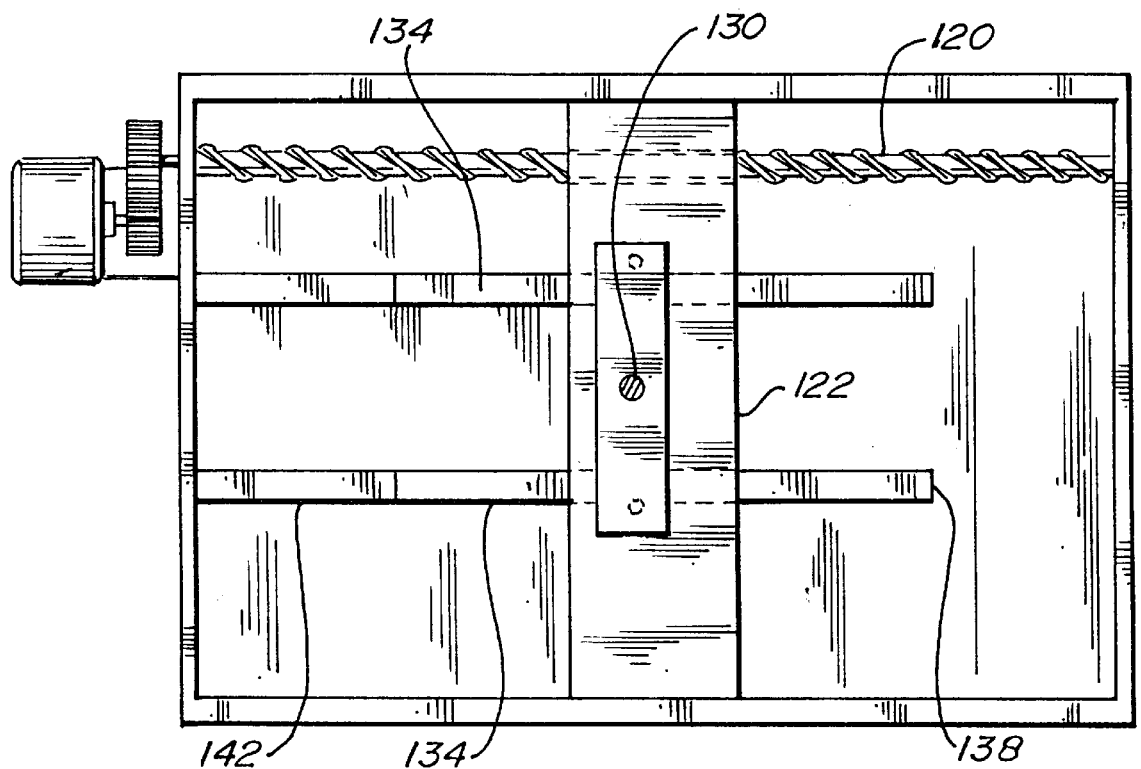
FIG. 8 is a cross-section taken along the lines 8 of FIG. 6.
Figure 7:
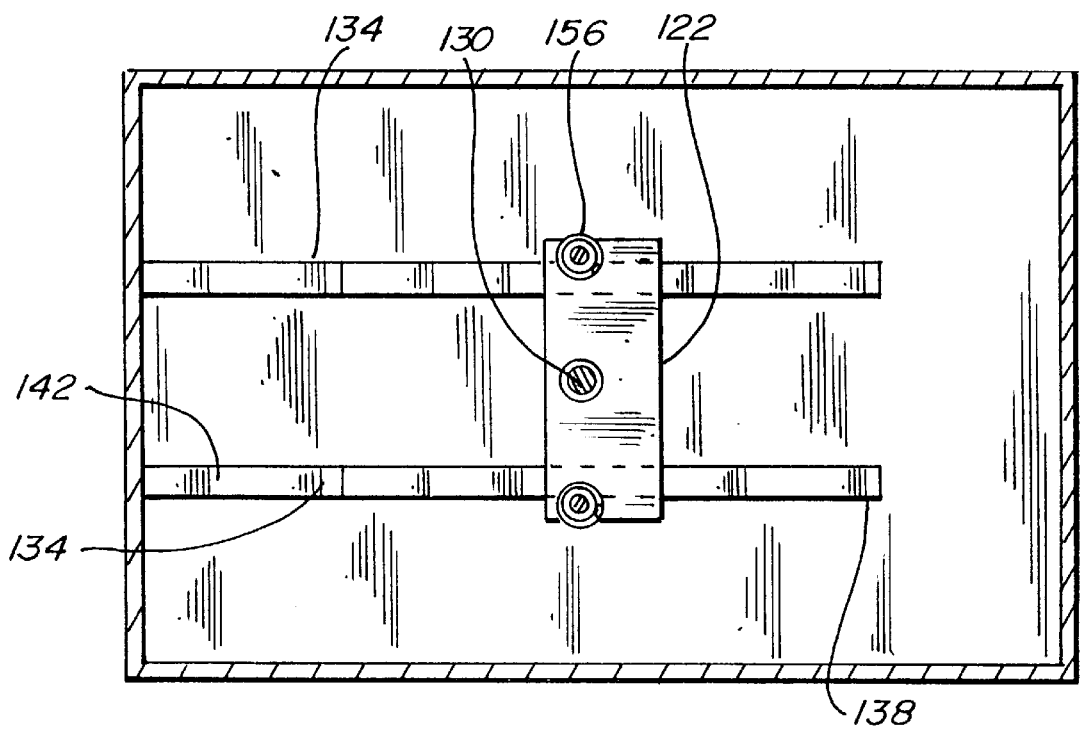
FIG. 7 is a cross-section taken along the lines 7 of FIG. 6.

The import/export element of the present invention is generally shown in the Figures as reference numeral 110.

Referring first to FIG. 5, the import/export element 110 further comprises a cartridge holder 112 adapted to receive the media cartridge C from the access opening 12. The cartridge C is inserted into the cartridge holder 112 with the slots S protruding from the cartridge holder 112.

The import/export element 110 also comprises a means 114 for translating the cartridge holder 112 between a first point A and a second point B.

The import/export element 110 further comprises a means 116 for rotating the cartridge holder 112 180 degrees while translating the cartridge holder 112 between the first point A and the second point B.

The import/export element 110 also comprises a means 118 for driving the rotating means 116.

More particularly, but without intending to list exclusive embodiments, the means 114 for translating the cartridge holder 112 comprises a first lead screw 120 mounted in a first direction D1 between the first point A and the second point B. The lead screw 120 rotates about a first axis X1 parallel to direction D1. The means 114 for translating also comprises a cartridge holder carrier 122 threadably engaging the first lead screw 120 and connected to the cartridge holder 112 for translation of the cartridge holder 112 along the first axis X1.

More particularly, but without intending to list exclusive embodiments, the means for rotating 116 further comprises a second lead screw 130 mounted in a second direction D2, the second direction D2 being substantially transverse to the first direction D1. The second lead screw 130 engages the cartridge holder 112 for rotation about a second axis X2 parallel to direction D2. The means for rotation 116 also comprises a rotation collar 132 threadably engaging the second lead screw 130 and fixedly attached to the cartridge holder carrier 122. The means for rotation 116 further comprises an inclined planar member 134 fixed along the first direction D1 and slidingly engaging the rotation collar 132.

It will be seen from FIGS. 5, 6, and 9 that, as the first lead screw 120 rotates, the cartridge holder carrier 122 is moved along axis X1 from point A toward point B. Rotation collar 132 moves with the cartridge holder carrier 122 and encounters the inclined planar member 134 at its first end 136, then gradually moves up the ramp portion 138 as the thickness of the ramp portion 138 gradually increases toward the second end 140. Spring members 156 keep the rotation collar engaged with the ramp portion 138. As the rotation collar 132 moves up the ramp portion 138, it forces the second lead screw 130 to turn. The rotation collar 132 is fixedly attached to the cartridge holder carrier 122, therefore the second lead screw 130 is the only unconstrained element which may move as the rotation collar 132 moves up the ramp portion 138. In turn, rotation of the second lead screw causes the cartridge holder carrier, which is engaged to the second lead screw, to rotate about the axis X2. When rotation collar 132 reaches the flat portion 142 of the inclined planar member 134, rotation of the second lead screw 130 stops.

To provide for about 180 degrees of rotation of the cartridge holder 112 between point A and point B, the maximum thickness of the inclined member (at the junction of the flat portion 142 and ramp portion 138), should be equal to one-half of the pitch of the second lead screw 130. "Pitch" as defined herein means the distance between two corresponding points on adjacent screw threads of a screw.

The various elements of the import/export element 110, specifically the first lead screw 120, second lead screw 130, rotation collar 132, and inclined planar member 134 may be contained in an import/export element housing 150.

Preferably, the import/export element housing 150 further comprises at least one rail 152 extending in the first direction D1, and the cartridge holder carrier 122 comprises at least one ear 154 slidingly engaging the rail 152. Preferably, at least one spring 156 biases the ear 154 against the rail 152. This will ensure that there is no "play" in the mechanism as it moves along the inclined member 134.

The means 118 for driving the rotating means 116 may be any source of rotational motion, such as a belt or gear. Preferably, the means 118 for driving comprises an electric motor 160 geared to the first lead screw 120 through gears 162.

The cartridge holder 112 preferably has a detent 113 adapted to retain the cartridge C in the cartridge holder 112.

In operation, the operator loads the cartridge C into the cartridge holder 112 as the cartridge holder carrier 112 is at a point nearest the access opening 12 (which may be either point A or point B). As discussed, the operator loads the cartridge C so that the slots S protrude outside the cartridge holder 112. By any suitable means, for example, tripping of a sensor within the cartridge holder carrier 112, the driving means 118 is energized, causing rotation of the first lead screw 120 and motion of the cartridge holder carrier 122 towards the media store (which is the other point, A or B). Simultaneously, the cartridge holder carrier 122 is rotated 180 degrees so that by the time it reaches a point near the media store, the slots S are facing toward the media store and media transport element 170. Media transport element 170 may then grip the cartridge by the slots S and move it elsewhere in the data storage library 10. To remove a cartridge from the library, the process is reversed.

The present invention maybe embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. In a data media storage library for storing and accessing storage media, the storage media being contained in cartridges, the data media storage library having a library housing, an access opening in the library housing for inserting cartridges, a storage array within the library housing including a number of storage locations, a plurality of media storage elements adapted to hold the storage media, a plurality of data transfer elements adapted to read and write information on the storage media, and a media transport element within the library housing adapted to move the storage media between the media storage element and the data transfer element, an import/export element comprising:

(a) a cartridge holder adapted to receive the media cartridge from the access opening;

(b) means for translating said cartridge holder between a first point and a second point wherein said means for translating the cartridge holder further comprises a first lead screw mounted in a first direction between said first point and said second point and rotating about a first axis parallel to said first direction and a cartridge holder carrier threadably engaging said first lead screw and connected to said cartridge holder for translation of said cartridge holder along said first axis;

(c) means for rotating said cartridge holder 180 degrees while translating said cartridge holder between said first point and said second point wherein said means for rotating said cartridge holder further comprises:

(i) a second lead screw mounted in a second direction, said second direction being substantially transverse to said first direction, said second lead screw engaging said cartridge holder carrier for rotation about a second axis parallel to said second direction;

(ii) a rotation collar threadably engaging said second lead screw and fixedly attached to said cartridge holder carrier; and (iii) an inclined planar member fixed along said first direction and slidingly engaging said rotation collar, wherein rotation of said first lead screw moves said cartridge holder carrier along said first axis, thereby causing movement of said rotation collar along said inclined planar member and thereby causing rotation of said second lead screw within said rotation collar, resulting in rotation of said cartridge holder about said second axis; and (d) means for driving said rotating means.

2. The import/export element of claim 1, wherein said cartridge holder further comprises a detent adapted to retain the media cartridge in said cartridge holder.

3. The import/export element of claim 1, further comprising an import/export element housing containing said first lead screw, said second lead screw, said rotation collar, and said inclined planar member.

4. The import/export element of claim 1, wherein said inclined planar member further comprises a ramp portion having a first end adjacent said first point and a second end adjacent said second point and having a thickness gradually increasing from said first end towards said second end, and a maximum thickness equal to one-half of the pitch of said second lead screw.

5. The import/export element of claim 4, wherein said inclined planar member further comprises a flat portion adjacent said second end.

6. The import/export element of claim 1, further comprising an import/export element housing containing said first lead screw, said second lead screw, said rotation collar, and said inclined plane member, and at least one rail in said import/export element housing extending in said first direction, and said cartridge holder carrier further comprising at least one ear slidingly engaging said at least one rail.

7. The import/export element of claim 6, further comprising at least one spring biasing said ear against said rail.

8. The import/export element of claim 1, wherein said means for driving said rotating means comprises an electric motor.

9. In a data media storage library for storing and accessing storage media, the storage media being contained in cartridges, the data media storage library having a library housing, an access opening in the library housing for inserting cartridges, a storage array within the library housing including a number of storage locations, a plurality of media storage elements adapted to hold the storage media, a plurality of data transfer elements adapted to read and write information on the storage media, and a media transport element within the library housing adapted to move the storage media between the media storage element and the data transfer element, an import/export element comprising:

a) a cartridge holder adapted to receive the media cartridge from the access opening;

b) a first lead screw mounted in a first direction between a first point and a second point and rotating about a first axis parallel to said first direction;

c) a cartridge holder carrier threadably engaging said first lead screw and connected to said cartridge holder for translation of said cartridge holder along said first axis;

d) a second lead screw mounted in a second direction, said second direction being substantially transverse to said first direction, said second lead screw engaging said cartridge holder carrier for rotation about a second axis parallel to said second direction;

e) a rotation collar threadably engaging said second lead screw and fixedly attached to said cartridge holder carrier; and f) an inclined planar member fixed along said first direction and slidingly engaging said rotation collar, wherein rotation of said first lead screw moves said cartridge holder carrier along said first axis, thereby causing movement of said rotation collar along said inclined planar member and thereby causing rotation of said second lead screw within said rotation collar, resulting in rotation of said cartridge holder about said second axis; and g) means for driving said rotating means.

10. The import/export element of claim 9, wherein said inclined planar member further comprises a ramp having a first end adjacent said first point and a second end adjacent said second point and having a thickness gradually increasing from said first end towards said second end, and a maximum thickness equal to one-half of the pitch of said second lead screw.

11. The import/export element of claim 9, wherein said inclined planar member further comprises a flat portion adjacent said second end.

12. The import/export element of claim 9, further comprising an import/export element housing containing said first lead screw, said second lead screw, said rotation collar, and said inclined plane member, and at least one rail in said import/export element housing extending in said first direction, and said cartridge carrier further comprising at least one ear slidingly engaging said at least one rail.

13. The import/export element of claim 12, further comprising at least one spring biasing said ear against said rail.

14. The import/export element of claim 9, wherein said means for driving said rotating means comprises an electric motor.

15. In a data media storage library for storing and accessing storage media, the storage media being contained in cartridges, the data media storage library having a library housing, an access opening in the library housing for inserting cartridges, a storage array within the library housing including a number of storage locations, a plurality of media storage elements adapted to hold the storage media, a plurality of data transfer elements adapted to read and write information on the storage media, and a media transport element within the library housing adapted to move the storage media between the media storage element and the data transfer element, an import/export element comprising:

a) a cartridge holder adapted to receive the media cartridge from the access opening;

b) a first lead screw mounted in a first direction between a first point and a second point and rotating about a first axis parallel to said first direction;

c) a cartridge holder carrier threadably engaging said first lead screw and connected to said cartridge holder for translation of said cartridge holder along said first axis;

d) a second lead screw mounted in a second direction, said second direction being substantially transverse to said first direction, said second lead screw engaging said cartridge holder carrier for rotation about a second axis parallel to said second direction;

e) a rotation collar threadably engaging said second lead screw and fixedly attached to said cartridge holder carrier; and f) an inclined planar member fixed along said first direction and slidingly engaging said rotation collar, wherein said inclined planar member further comprises a ramp having a first end adjacent said first point and a second end adjacent said second point and having a thickness gradually increasing from said first end towards said second end, and a maximum thickness equal to one-half of the pitch of said second lead screw, wherein rotation of said first lead screw moves said cartridge holder carrier along said first axis, thereby causing movement of said rotation collar along said inclined planar member and thereby causing rotation of said second lead screw within said rotation collar, resulting in rotation of said cartridge holder 180 degrees about said second axis; and g) an electric motor for driving said first lead screw.

16. The import/export element of claim 15, wherein said inclined planar member further comprises a flat portion adjacent said second end.

17. The import/export element of claim 14, further comprising an import/export element housing containing said first lead screw, said second lead screw, said rotation collar, and said inclined plane member, and at least one rail in said import/export element housing extending in said first direction, and said cartridge carrier further comprising at least one ear slidingly engaging said at least one rail.

18. The import/export element of claim 16, further comprising at least one spring biasing said ear against said rail.

* * * * *